United States Patent
Ram et al.

(10) Patent No.: US 9,684,218 B2
(45) Date of Patent: Jun. 20, 2017

(54) LOW-COST CHROMATIC DEVICES

(71) Applicants: Manoj Kumar Ram, Palm Harbor, FL (US); Elias K. Stefanakos, Tampa, FL (US); D. Yogi Goswami, Tampa, FL (US)

(72) Inventors: Manoj Kumar Ram, Palm Harbor, FL (US); Elias K. Stefanakos, Tampa, FL (US); D. Yogi Goswami, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 14/425,568

(22) PCT Filed: Nov. 7, 2013

(86) PCT No.: PCT/US2013/068998
§ 371 (c)(1),
(2) Date: Mar. 3, 2015

(87) PCT Pub. No.: WO2014/074743
PCT Pub. Date: May 15, 2014

(65) Prior Publication Data
US 2015/0234248 A1  Aug. 20, 2015

Related U.S. Application Data

(60) Provisional application No. 61/723,409, filed on Nov. 7, 2012.

(51) Int. Cl.
*G02F 1/15* (2006.01)
*G02F 1/153* (2006.01)
*C03C 17/42* (2006.01)

(52) U.S. Cl.
CPC .............. *G02F 1/153* (2013.01); *C03C 17/42* (2013.01); *C03C 2217/211* (2013.01); *C03C 2217/215* (2013.01)

(58) Field of Classification Search
CPC  G02F 2201/44; B60R 1/088; B32B 17/10513
(Continued)

(56) References Cited

U.S. PATENT DOCUMENTS

| | | |
|---|---|---|
| 5,086,351 A | 2/1992 | Couput et al. |
| 5,384,653 A | 1/1995 | Benson et al. |

(Continued)

FOREIGN PATENT DOCUMENTS

WO  2011042430  4/2011

OTHER PUBLICATIONS

Granqvist, Claes Göran. "Oxide-based electrochromic materials and devices prepared by magnetron sputtering." Reactive Sputter Deposition. Springer Berlin Heidelberg, 2008. 485-495.

(Continued)

*Primary Examiner* — Mahidere Sahle
(74) *Attorney, Agent, or Firm* — Thomas | Horstemeyer, LLP

(57) ABSTRACT

In one embodiment, a chromatic device includes an active layer and an electrolyte layer in contact with the active layer, wherein the active layer has an opaque color that blocks light but changes to a translucent color that transmits light when a metal object is placed in electrical contact with the active layer in the presence of the electrolyte layer.

20 Claims, 8 Drawing Sheets

(58) Field of Classification Search
USPC .......................................... 359/240, 265–275
See application file for complete search history.

(56) References Cited

U.S. PATENT DOCUMENTS

| | | |
|---|---|---|
| 5,532,869 A | 7/1996 | Goldner et al. |
| 5,724,177 A | 3/1998 | Ellis, Jr. et al. |
| 6,005,705 A | 12/1999 | Schmidt et al. |
| 6,094,292 A | 7/2000 | Goldner et al. |
| 6,369,934 B1 | 4/2002 | Bechinger |
| 6,433,914 B1 | 8/2002 | Lomprey et al. |
| 6,744,549 B2 | 6/2004 | Vincent et al. |
| 7,154,657 B2 | 12/2006 | Poll et al. |
| 7,719,751 B2 | 5/2010 | Egerton et al. |
| 7,722,966 B1 | 5/2010 | Lee et al. |
| 2002/0118437 A1 | 8/2002 | Rukavina et al. |
| 2005/0128560 A1 | 6/2005 | Vincent |
| 2005/0231785 A1* | 10/2005 | Oh .................. B24B 37/04 359/265 |
| 2009/0078917 A1 | 3/2009 | Percec |
| 2009/0185256 A1* | 7/2009 | Nakaho .............. G02F 1/1523 359/270 |
| 2009/0251785 A1 | 10/2009 | Bruhnke |
| 2011/0061708 A1* | 3/2011 | Huang ................ G02F 1/15 136/244 |

OTHER PUBLICATIONS

Cummins, David, et al. "Ultrafast electrochromic windows based on redox-chromophore modified nanostructured semiconducting and conducting films." The Journal of Physical Chemistry B 104.48 (2000): 11449-11459.

International Search Report and Written Opinion mailed Feb. 24, 2014.

* cited by examiner

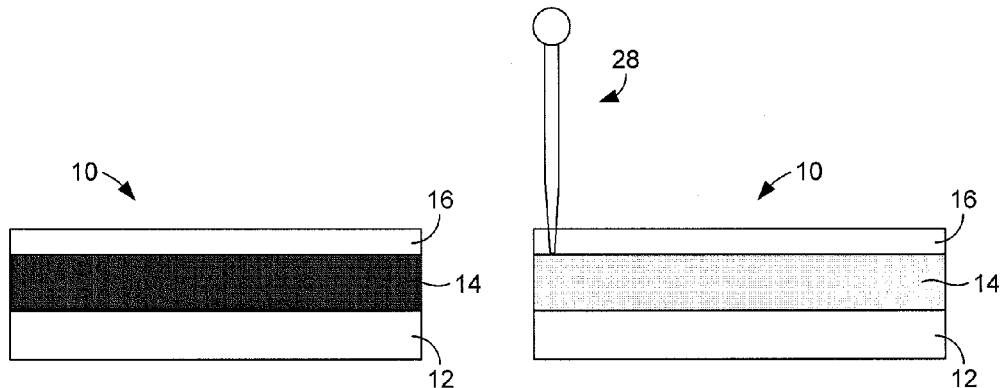
FIG. 1A  FIG. 1B
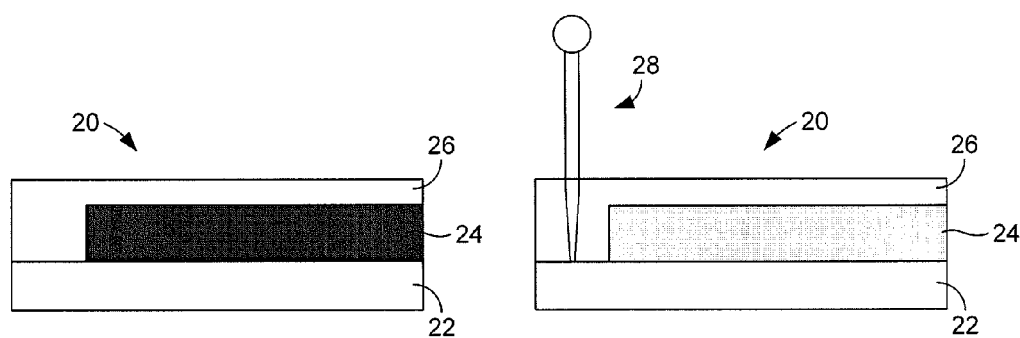
FIG. 2A  FIG. 2B
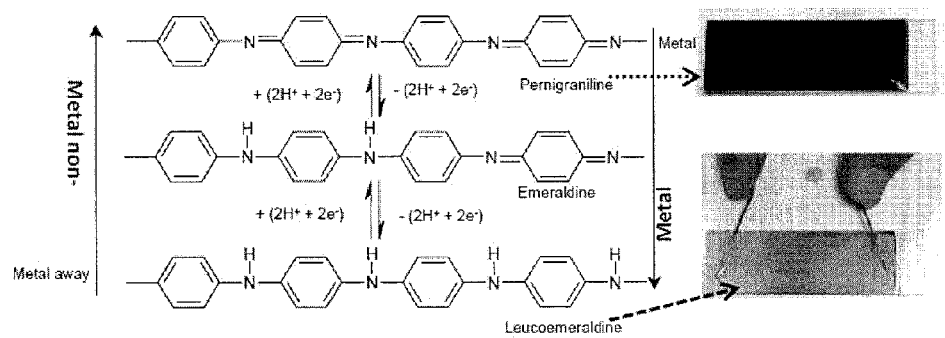
FIG. 3

LOW-COST CHROMATIC DEVICES

CROSS-REFERENCE TO RELATED APPLICATION

This application is the 35 U.S.C. §371 national stage of, and claims priority to and the benefit of, PCT application PCT/US2013/068998, filed Nov. 7, 2013, which claims priority to and the benefit of U.S. Provisional Application No. 61/723,409, filed on Nov. 7, 2012, herein incorporated by reference in their entirety.

BACKGROUND

Windows are responsible for 30% of the heating and cooling loads in buildings. Thin film coatings on glass with color change capabilities could reduce energy consumption by reflecting unwanted radiation and transmitting needed radiation during daylight hours. Dynamic daylight and solar energy control in buildings presently can be achieved using smart windows based on electrochromic, gasochromic, liquid crystal, or electrophoretic devices. However, commercial versions of such technologies have not become popular due to their high costs. Furthermore, electrochromic windows require electrical energy to switch from one state to the other, and liquid crystal windows require continuous energy to remain in the transparent or colored state.

To date, success has been shown only by electrochromic windows in reducing cooling, heating, and lighting energy loads with modulation up to 68% transmission of the total solar spectrum. State of the art electrochromic windows can reduce up to 26% of lighting energy and 20% of peak cooling loads.

In view of the above discussion, it can be appreciated that it would be desirable to have a chromatic devices that can be used with windows that are both effective and inexpensive to produce and operate.

BRIEF DESCRIPTION OF THE DRAWINGS

The present disclosure may be better understood with reference to the following figures. Matching reference numerals designate corresponding parts throughout the figures, which are not necessarily drawn to scale.

FIGS. 1A and 1B are schematic drawings of a first embodiment of a chromatic device.

FIGS. 2A and 2B are schematic drawings of a second embodiment of a chromatic device.

FIG. 3 comprises a diagram that illustrates a mechanism of color change (left) and a demonstration of color change that occurs in response to contact with metal pins (right).

DETAILED DESCRIPTION

Figure 4:
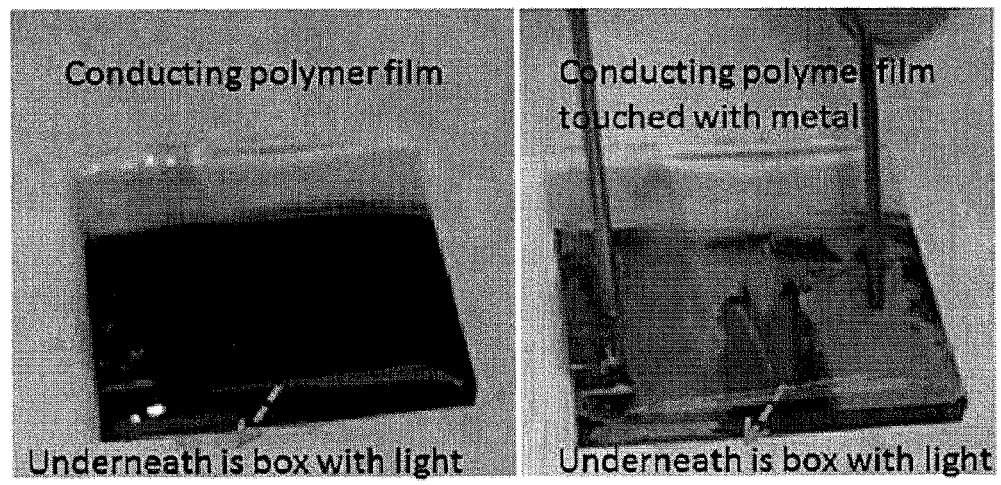
FIG. 4 comprises images of an electrolyte-treated polyaniline film before (left) and after (right) contact with metal pins (film placed on an internally lighted box).

As described above, it would be desirable to have a chromatic device that is both effective and less expensive to produce and operate than existing devices, such as electrochromic devices. Examples of such chromatic devices are disclosed herein. In some embodiments, the chromatic devices comprise a conducting polymer and an electrolyte. In its natural state, the conducting polymer has an opaque color that blocks or absorbs light. When a metal contact is applied to the conducting polymer, however, the polymer changes to a translucent color or, in some cases, becomes transparent so as to transmit light.

In the following disclosure, various specific embodiments are described. It is to be understood that those embodiments are example implementations of the disclosed inventions and that alternative embodiments are possible. All such embodiments are intended to fall within the scope of this disclosure.

The inventors have observed color change in conducting polymers and conducting polymer nanocomposites using a metal contact in presence of an electrolyte. The color of the conducting polymer changes when the metal comes in contact with the conducting polymer film. In some embodiments, a conducting polymer can exist in a leucomeraldine state (faded yellow to transparent), an emeraldine state (blue to green), and a pernigraniline state (violet). As described below, chromatic devices, such as chromatic windows, can be developed that exhibit such properties. Unlike electrochromic devices, no electrical energy must be applied to the chromatic device to effect the color change. Instead, the color change is induced by supplying electrons from a metal contact to the conducting polymer film. In addition, the disclosed chromatic devices are much less expensive to produce than electrochromic devices.

FIGS. 1 and 2 illustrate two examples of chromatic devices. Beginning with FIG. 1A, a chromatic device 10 generally comprises three layers of material, including a substrate 12, an active layer 14, and an electrolyte layer 16. In some embodiments, the substrate 12 comprises a metal oxide-coated conductive glass plate, such as an indium tin oxide (ITO)-coated glass plate.

The active layer 14 comprises one or more conducting polymers. In some embodiments, the active layer 14 is formed as a homogeneous conducting polymer film. In other embodiments, the active layer 14 is formed as a composite film that is a mixture of both one or more conducting polymers and one or more metal oxides, such as ITO, zinc oxide (ZnO), or nanodiamond. In either case, the active layer 14 can be deposited on the substrate 12 using any one of a variety of techniques, including electrochemically, by solution cast, or using a self-assembly technique. Suitable conducting polymers can include polyanilines (polyaniline, poly(ortho-anisidine), POT, poly(ethoxy-aniline), substituted polyaniline, polypyrroles, polythiophene, polyindole, polycarbazole, substituted polycarbazole, and mixtures thereof. In some embodiments, the conducting polymer has a natural blue, green, or bluish-green color that is opaque when the polymer is present in sufficient quantities. Such a color is represented by the dark color of the active layer 14 in FIG. 1A.

The electrolyte layer 16 comprises an oxidant and an acid. Example oxidants include aluminum nitrate, ammonium dichromate, ammonium peroxydisulphate, barium nitrate, bismuth nitrate, calcium hypoperchlorate, copper (II) nitrate, cupric nitrate, ferric nitrate, hydrogen peroxide, lithium hydroxide monohydrate, magnesium nitrate, magnesium perchlorate, potassium chlorate, potassium dichromate, potassium permanganate, sodium hypochlorite, sodium periodate, zinc nitrate hydrate, nitric acid, sulfuric acid, perchloric acid, ammonium nitrate, silver nitrate, benzoyl peroxide, tetranitromethane, and mixtures thereof. Example acids include glacial acetic acid, propionic acid, hydrochloric acid, hydrofluoric acid, phosphoric acid, acetic acid (non-glacial), sulfuric acid, formic acid, benzoic acid, hydrofluoric acid, nitric acid, phosphoric acid, sulfuric acid, tungstosilicic acid hydrate, hydriodic acid, carboxylic acids, acetic acid ($CH_3COOH$), dicarboxylic, tricarboxylic, oxalic acid, hexacarboxylic acid, citric acid, tartaric acid, and mixtures thereof.

FIG. 2A illustrates a second embodiment of a chromatic device 20. As is shown in this figure, the chromatic device 20 also comprises a substrate 22, an active layer 24, and an electrolyte layer 26, which can have compositions similar to the like-named layers described above in relation to FIG. 1A. However, the electrolyte layer 26 of the device 20 extends over a lateral edge of the active layer 24 and makes contact with the substrate 22.

Polyaniline is considered a particularly suitable conducting polymer for use in constructing a device such as one of those illustrated in FIGS. 1A and 1B. Polyaniline can exist in a leucomeraldine state (faded yellow to transparent), an emeraldine state (blue to green), and a pernigraniline state (violet), each of which is reversible. Polyaniline requires two electrons and two hydrogen atoms to change from the pernigraniline state to the emeraldine state, and from the emeraldine to the leucomeraldine state, in the presence of an electric field or a solution containing an oxidizing or reducing agent. However, it has been discovered by the inventors that polyaniline changes color from violet, to faded yellow, to transparent by simply contacting the film with a metallic object, such as a pin. This is illustrated in FIGS. 1B and 2B, which illustrate the chromatic devices 10 and 20 after a metal pin 28 contacts the active layer 14 (FIG. 1B) or the substrate 22 (FIG. 2B). As is depicted in those figures, the active layers 14, 24 have changed to a light color (e.g., yellow).

In an initial experiment, an electrolytic solution containing a source for hydrogen and electrons was applied to a polyaniline film. As shown in FIG. 3, the film changed from violet, to faded yellow, to transparent when the film was contacted with metal pins. When the metal pins were disconnected, however, the color changed back to violet in a matter of seconds.

Figure 5:
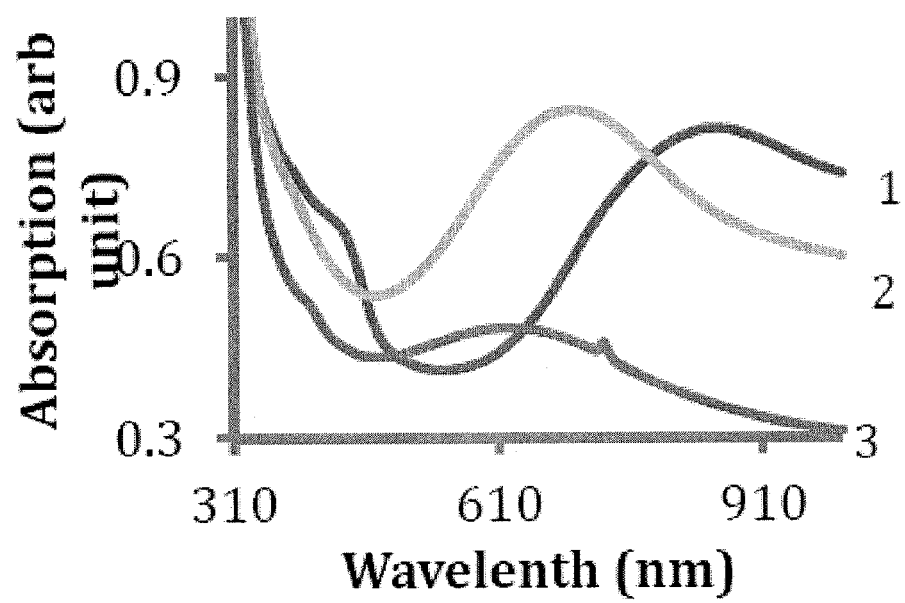
FIG. 5 is a graph that shows the absorption magnitude of a polymer film comprising (1) a doped polymer, (2) a polymer-electrolyte, and (3) a polymer electrolyte when the film is contacted with metal.

Further experiments were performed to test color change in devices such as those shown in FIGS. 1 and 2. As shown in FIG. 4, the color change of polyaniline film in an oxided state (left) and a reduced state (right). FIG. 5 shows the change of the absorption magnitude of the polymer film when treated with an electrolyte and contacted with a metal contact. The figure shows that the electrolyte-treated film absorbs visible light more than the untreated film.

Figure 6:
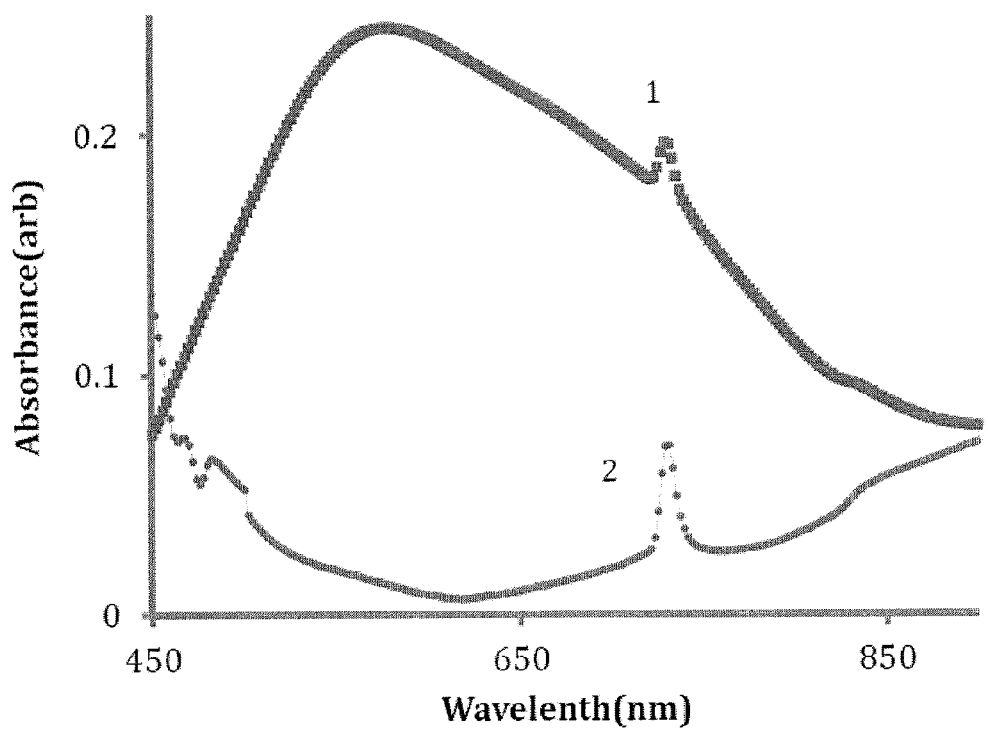
FIG. 6 is a graph that shows the absorption magnitude of a polymer film in electrolyte (1) when in contact with metal, and (2) when not in contact with metal.
Figure 7:
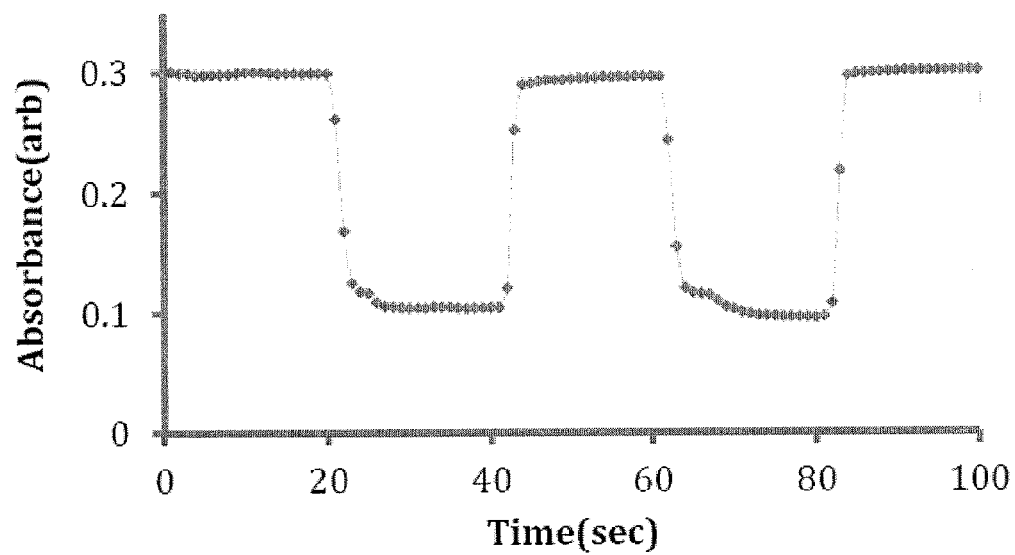
FIG. 7 is a graph that shows the absorption magnitude of a polymer film in electrolyte when contact is made and broken between metal and the film.

FIG. 6 shows the change of the absorption magnitude of an electrolyte-treated polymer film when contacted by metal (2) and not contacted by metal (1). As indicated in the figure, the metal contact brings the change of absorption of the UV-visible spectra. As shown in FIG. 7, the UV-visible absorption magnitude changes as metal makes and breaks contact with the conductive polymer.

Figure 8:
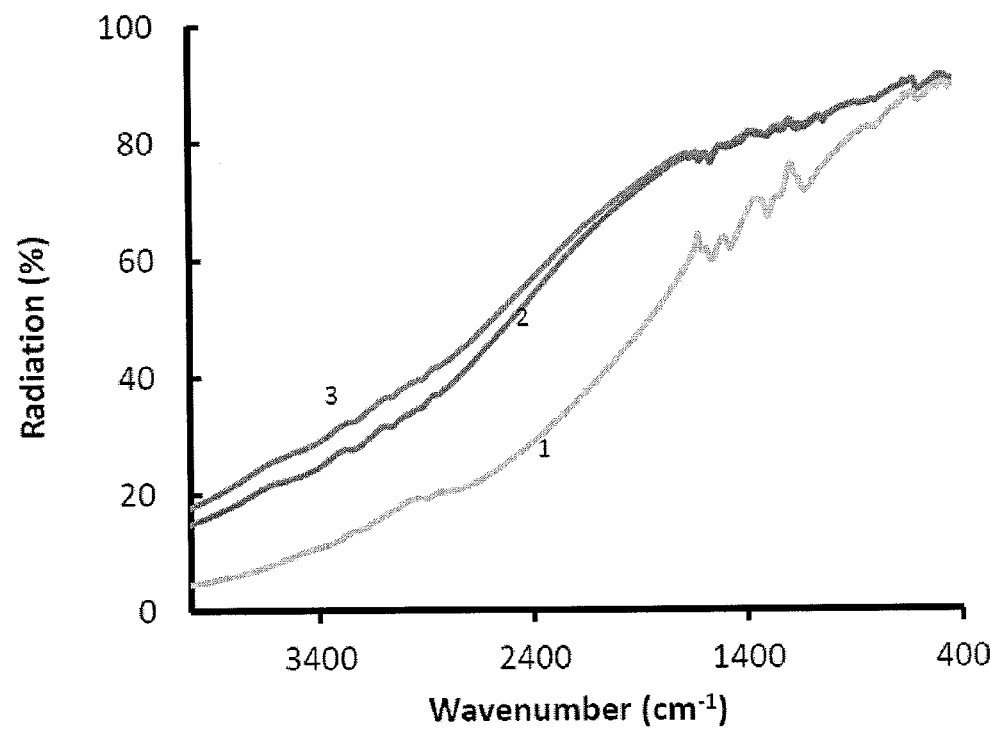
FIG. 8 is a graph that shows the Fourier transform infrared spectroscopy (FTIR) spectra of a polymer film (1) on an ITO coated plate, (2) on an electrolyte-treated ITO/polymer, and (3) on an ITO/polymer with metal contact.

FIG. 8 shows the Fourier transform infrared spectroscopy (FTIR) spectra of a polymer film on an ITO-coated plate, electrolyte-treated ITO/polymer, and ITO/polymer after metal contact. Interestingly, the electrolyte-treated ITO/polymer shows greater reflectance than other types of films indicating chromatic films reflect the infrared more than the other form of polyaniline film.

Figure 9:
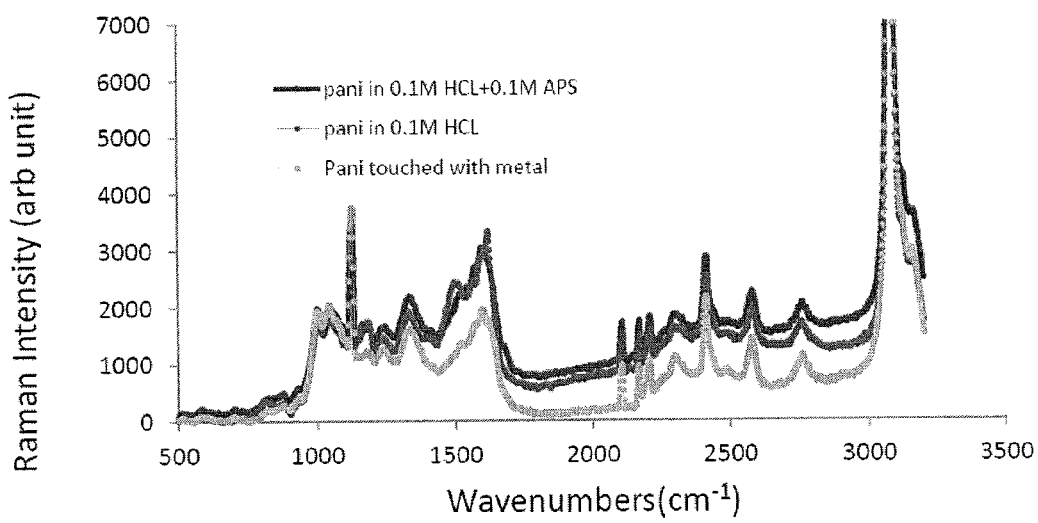
FIG. 9 illustrates Raman transmission spectra of a chromatic device: (1) polymer, (2) polymer/electrolyte, and (3) after metal contact of polymer/electrolyte.

FIG. 9 shows the Raman transmission spectra of a film that is (1) polyaniline doped with HCl (2) polyaniline doped with APS+HCl, and (3) polyaniline doped with APS+HCl and studied after metal contact.

Figure 10A:
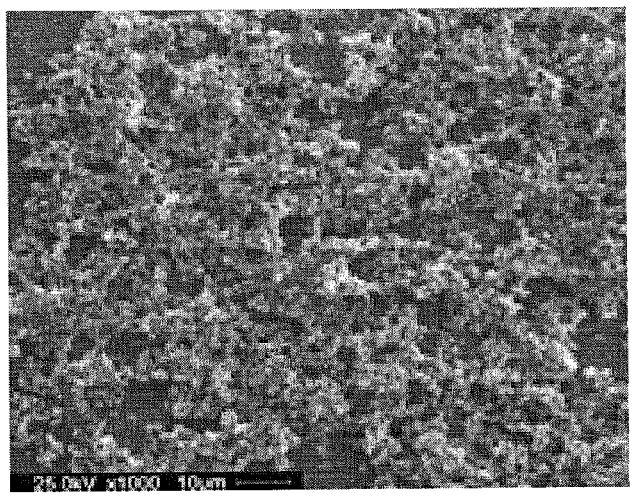
FIGS. 10A-10C are scanning electron microscope (SEM) images of polyaniline in (A) an emeraldine state, (B) pernigraniline state (treated with oxidant and acid), and (C) the metal contact pernigraniline state after changing color and being dried for SEM measurement.
Figure 10B:
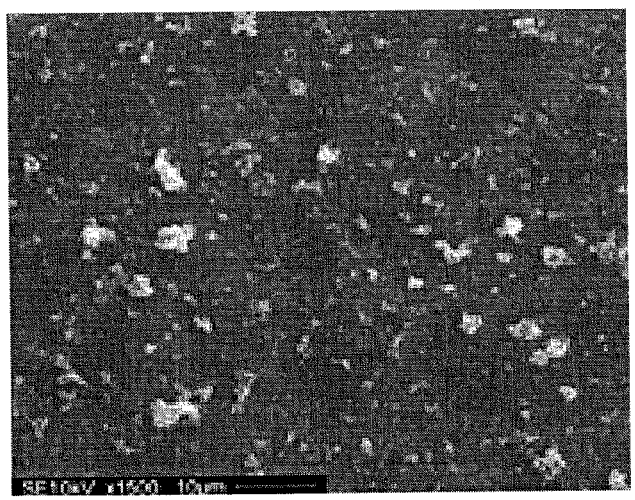
Figure 10C:
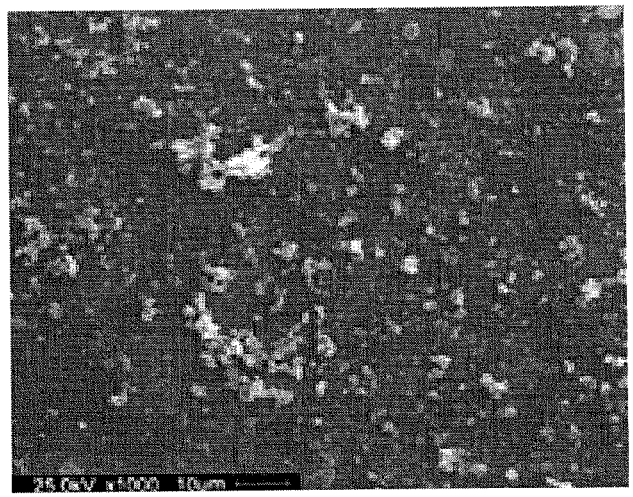

FIGS. 10A-10C show the scanning electron microscope (SEM) images of polyaniline in (1) emeraldine form, (2) pernigraniline form (treated with oxidant and acid), and (3) pernigraniline form after contact with metal. The metal contact pernigraniline form changed color and was dried for the measurement. The clear change of the film structure is observed with treatment of oxidant and acid (FIGS. 10A and 10B) whereas no change is observed after the metal contact is removed so that the film obtained its structure. This is important for the stability of the chromatic film to be reversible.

Figure 11A:
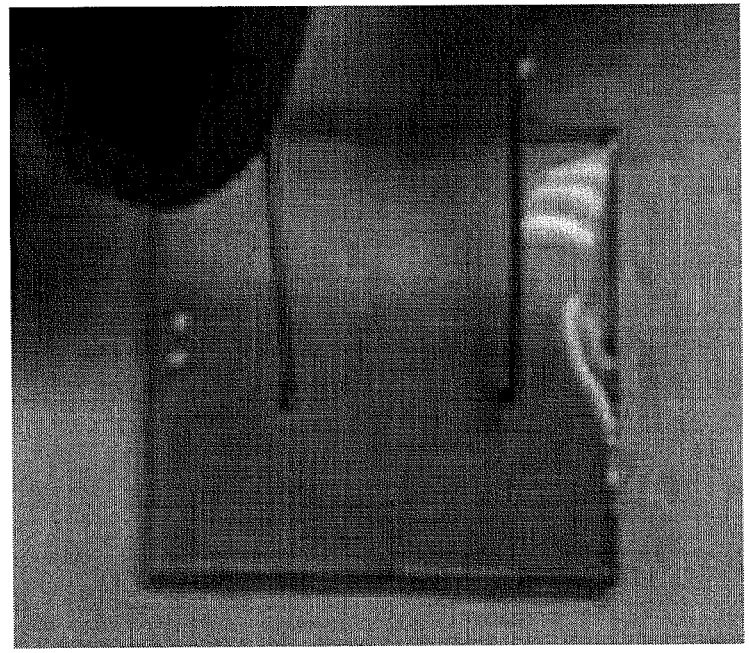
FIG. 11 illustrates a ploypyrrole film (A) before metal contact, and (B) after metal contact.
Figure 11B:
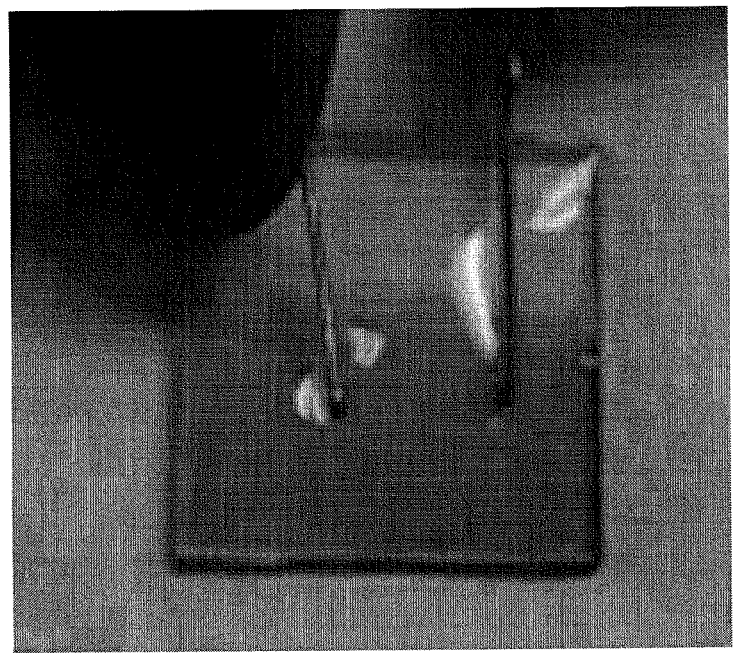

Polypyrrole film was synthesized using an electrochemical process (contact current 2 $mA/cm^2$) for further color-change experiments. FIG. 11A shows the polypyrrole film before metal contact and FIG. 11B shows the polypyrrole film after metal contact. The metal contact changed the film from black to light brown. The polypyrrole only changed color from undoped to doped (polaron/bipolaron) states. The two states of polypyrrole are clearly visible in FIGS. 11A and 11B.

Figure 12:
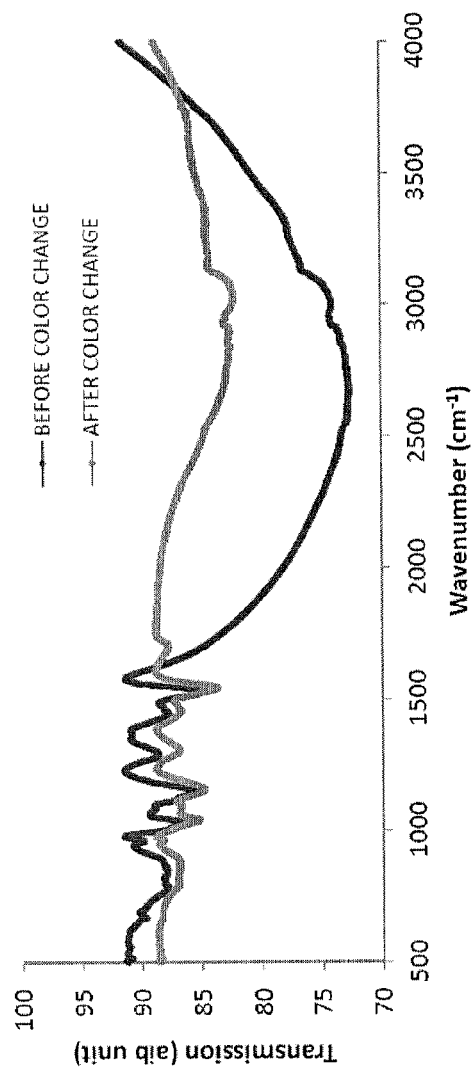
FIG. 12 illustrates the FTIR transmission spectra of polypyrrole film (1) in a blue state, and (2) in a red state after metal contact.
Figure 13:
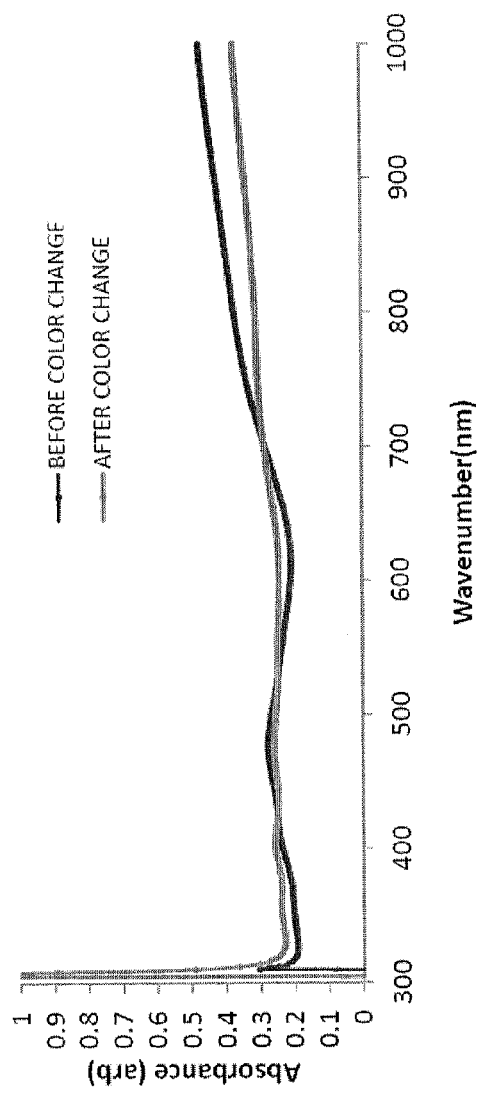
FIG. 13 illustrates UV-visible transmission spectra of polypyrrole film (1) in a blue state, and (2) in a red state after contact with metal.

FIG. 12 shows the FTIR transmission spectra of a polypyrrole film having (1) a blue color (initial state), and (2) a red color after metal contact. FIG. 13 shows the UV-visible transmission spectra of polypyrrole film (1) in the blue state, and (2) in the red state.

Figure 14:
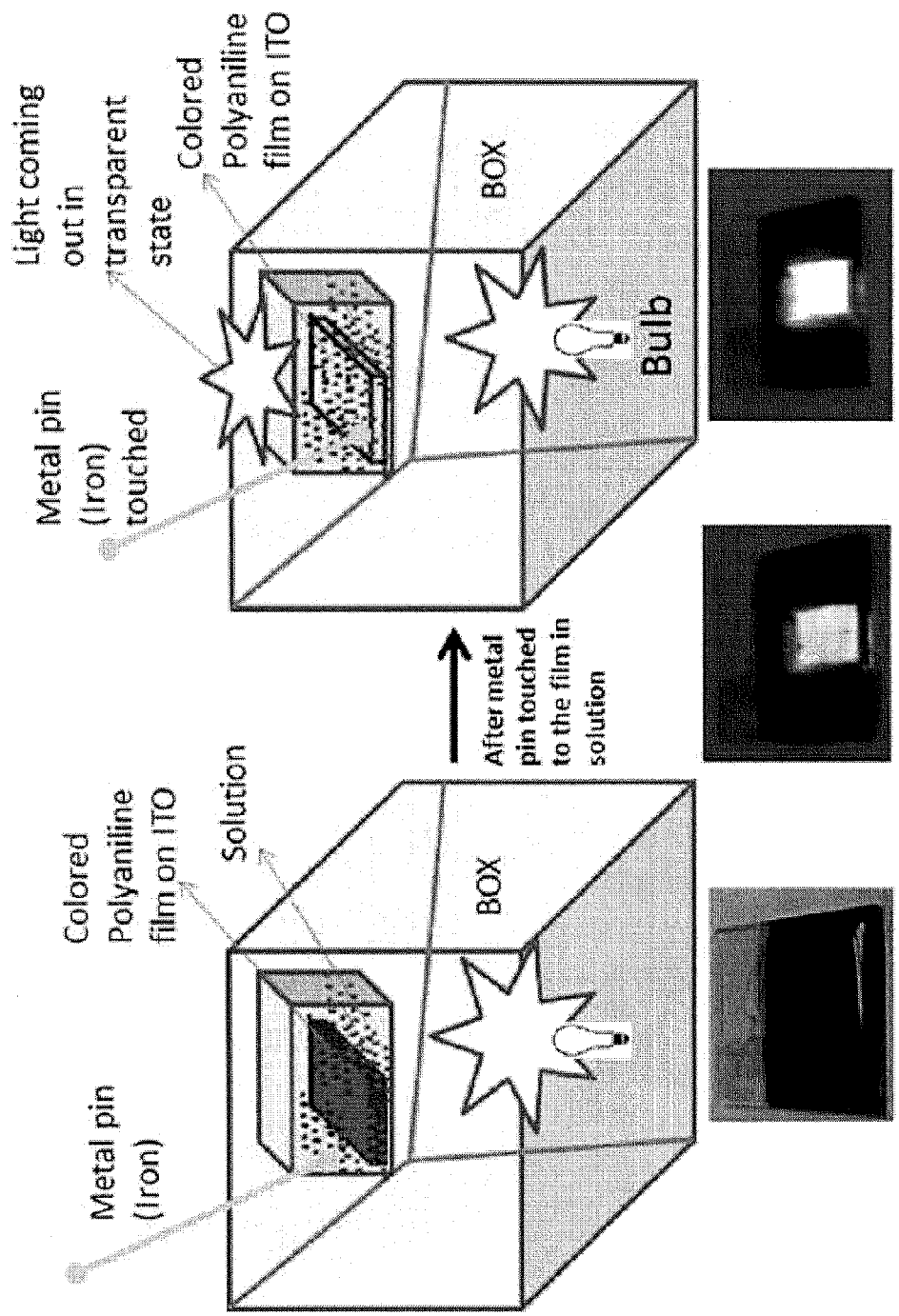
FIG. 14 is a schematic drawing showing how a chromatic device could be used to control the light within an enclosed space.

FIG. 14 schematically illustrates how a chromatic device can be used to control the light that exits or enters an enclosed space, such as a room of a house.

As shown in the figure, a box is provided with internal light source and a window of the box is covered by a chromatic device. When no metal contacts the chromatic device, the light from within the box is not visible from outside the box (left). When metal touches the chromatic device, however, the light from within the box becomes visible (right).

In the above disclosure, the substrates to which the conducting polymer is applied was identified as being transparent substrates, such as glass substrates. It is noted, however, that the substrate can be opaque and/or can be made of other materials. For example, the substrate can alternatively be made of metal or a fabric. In such situations, the color change of the conducting polymer can be used for purposes other than blocking and transmitting light. For example, the color change could be used as a type of camouflage in military applications.

The invention claimed is:

1. A chromatic device comprising:
   an active layer;
   an electrolyte layer in contact with the active layer; and
   a metal object that can be alternately placed into and out of electrical contact with the active layer;
   wherein the active layer has an opaque color that blocks light when the metal object is not in electrical contact with the active layer but changes to a translucent color that transmits light when the metal object is placed in electrical contact with the active layer in the presence of the electrolyte layer, wherein the active layer changes color without applying electrical energy to the active layer.

2. The device of claim 1, further comprising a conductive, transparent substrate on which the active layer is formed.

3. The device of claim 2, wherein the substrate is a metal oxide-coated conducting glass plate.

4. The device of claim 1, wherein the active layer comprises a conducting polymer.

5. The device of claim 1, wherein the conducting polymer is a polyaniline.

6. The device of claim 1, wherein the conducting polymer is a polypyrrole.

7. The device of claim 1, wherein the conducting polymer comprises one or more of polyaniline, POT, poly(ethoxy-aniline), substituted polyaniline, polypyrrole, polythiophene, polyindole, polycarbazole, or substituted polycarbazole.

8. The device of claim 1, wherein the electrolyte layer comprises an oxidant and an acid.

9. The device of claim 8, wherein the oxidant comprises one or more of aluminum nitrate, ammonium dichromate, ammonium peroxydisulphate, barium nitrate, bismuth nitrate, calcium hypoperchlorate, copper (II) nitrate, cupric nitrate, ferric nitrate, hydrogen peroxide, lithium hydroxide monohydrate, magnesium nitrate, magnesium perchlorate, potassium chlorate, potassium dichromate, potassium permanganate, sodium hypochlorite, sodium periodate, zinc nitrate hydrate, nitric acid, sulfuric acid, perchloric acid, ammonium nitrate, silver nitrate, benzoyl peroxide, or tetranitromethane.

10. The device of claim 8, wherein the acid comprises one or more of glacial acetic acid, propionic acid, hydrochloric acid, hydrofluoric acid, phosphoric acid, acetic acid (non-glacial), sulfuric acid, formic acid, benzoic acid, hydrofluoric acid, nitric acid, phosphoric acid, sulfuric acid, tungstosilicic acid hydrate, hydriodic acid, carboxylic acids, acetic acid, dicarboxylic, tricarboxylic, oxalic acid, hexacarboxylic acid, citric acid, or tartaric acid.

11. A chromatic window for alternately blocking and transmitting light, the window comprising:
    a conductive, transparent substrate;
    an active layer formed on the substrate;
    an electrolyte layer in contact with the active layer; and
    a metal object that can be alternately placed into and out of electrical contact with the active layer;
    wherein the active layer has an opaque color that blocks light when no metal object is in electrical contact with the active layer but changes to a translucent color that transmits light when a metal object is placed in electrical contact with the active layer in the presence of the electrolyte layer, wherein the active layer changes color without applying electrical energy to the active layer.

12. The window of claim 11, wherein the substrate is a metal oxide-coated conducting glass plate.

13. The window of claim 11, wherein the active layer comprises a conducting polymer.

14. The window of claim 13, wherein the conducting polymer is a polyaniline or a polypyrrole.

15. The window of claim 13, wherein the conducting polymer comprises one or more of polyaniline, POT, poly(ethoxy-aniline), substituted polyaniline, polypyrrole, polythiophene, polyindole, polycarbazole, or substituted polycarbazole.

16. The window of claim 11, wherein the electrolyte layer comprises an oxidant and an acid.

17. A method for controlling the transmission of light, the method comprising:
    covering a window with an active layer and an electrolyte layer in contact with the active layer, wherein the active layer is opaque in its natural state and prevents light from passing through the window; and
    moving a metal object into electrical contact with the active layer to supply electrons from the metal object to the active layer to cause the active layer to change to a translucent color that enables light to pass through the window, wherein no electrical potential or field is applied to the active layer.

18. The method of claim 17, wherein the active layer comprises a conducting polymer.

19. The method of claim 18, wherein the conducting polymer comprises one or more of polyaniline, POT, poly(ethoxy-aniline), substituted polyaniline, polypyrrole, polythiophene, polyindole, polycarbazole, or substituted polycarbazole.

20. The method of claim 17, wherein the electrolyte layer comprises an oxidant and an acid.

* * * * *